United States Patent
Choi et al.

(10) Patent No.: US 9,713,794 B2
(45) Date of Patent: Jul. 25, 2017

(54) SEPARATION MEMBRANE INCLUDING GRAPHENE

(75) Inventors: Jae-young Choi, Suwon-si (KR); Ho-bum Park, Seoul (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 819 days.

(21) Appl. No.: 13/443,489

(22) Filed: Apr. 10, 2012

(65) Prior Publication Data
US 2012/0255899 A1 Oct. 11, 2012

(30) Foreign Application Priority Data
Apr. 11, 2011 (KR) ......................... 10-2011-0033373

(51) Int. Cl.
| | | |
|---|---|---|
| B01D 71/00 | (2006.01) | |
| B01D 53/00 | (2006.01) | |
| B01D 67/00 | (2006.01) | |
| B01D 69/10 | (2006.01) | |
| C02F 1/00 | (2006.01) | |
| B01D 71/02 | (2006.01) | |
| B01D 53/22 | (2006.01) | |
| C02F 1/44 | (2006.01) | |
| C02F 103/08 | (2006.01) | |

(52) U.S. Cl.
CPC ......... B01D 71/021 (2013.01); B01D 53/228 (2013.01); B01D 67/0067 (2013.01); B01D 69/10 (2013.01); C02F 1/441 (2013.01); B01D 2325/04 (2013.01); B01D 2325/20 (2013.01); C02F 2103/08 (2013.01)

(58) Field of Classification Search
CPC ................................................... B01D 71/021
See application file for complete search history.

(56) References Cited

U.S. PATENT DOCUMENTS

| | | | | |
|---|---|---|---|---|
| 3,398,091 | A * | 8/1968 | Greatorex | 426/432 |
| 5,104,425 | A * | 4/1992 | Rao | B01D 53/22 55/DIG. 5 |
| 7,309,385 | B2 * | 12/2007 | Hong | B01D 53/228 210/490 |
| 8,887,926 | B2 * | 11/2014 | Park et al. | 210/500.25 |
| 2002/0164521 | A1 * | 11/2002 | Wessel | B01D 69/12 429/411 |

(Continued)

FOREIGN PATENT DOCUMENTS

| | | | | |
|---|---|---|---|---|
| GB | 197353 A * | 5/1923 | | B01D 3/16 |
| JP | 2010-089397 A | 4/2010 | | |

(Continued)

OTHER PUBLICATIONS

Terrones, Mauricio, et al. Graphene and graphite nanoribbons: Morphology, properties, synthesis, defects and applications. Nano Today, 5, 351-372 (2010).*

(Continued)

*Primary Examiner* — Krishnan S Menon
*Assistant Examiner* — Ryan B Huang
(74) *Attorney, Agent, or Firm* — Harness, Dickey & Pierce P.L.C.

(57) ABSTRACT

According to example embodiments, a separation membrane includes a graphene on at least one surface of a polymer support. The graphene may include a plurality of grains defined by grain boundaries.

27 Claims, 7 Drawing Sheets

(56) References Cited

U.S. PATENT DOCUMENTS

| | | | |
|---|---|---|---|
| 2007/0158618 | A1 | 7/2007 | Song et al. |
| 2008/0248275 | A1* | 10/2008 | Jang .................. B82Y 30/00 428/220 |
| 2009/0155561 | A1* | 6/2009 | Choi et al. .................. 428/220 |
| 2009/0220767 | A1* | 9/2009 | Schlogl .................. B01J 21/18 428/323 |
| 2010/0074835 | A1* | 3/2010 | Mercuri .................. B82Y 30/00 423/448 |
| 2010/0096595 | A1 | 4/2010 | Prud'Homme et al. |
| 2010/0132773 | A1 | 6/2010 | Lagally et al. |
| 2010/0301279 | A1* | 12/2010 | Nesper .................. B82Y 30/00 252/502 |
| 2012/0000845 | A1 | 1/2012 | Park et al. |
| 2012/0048804 | A1* | 3/2012 | Stetson .................. B01D 61/02 210/653 |

FOREIGN PATENT DOCUMENTS

| | | |
|---|---|---|
| WO | WO 2008/130431 | 10/2008 |
| WO | WO 2010/110624 | 9/2010 |
| WO | WO 2011/066332 | 6/2011 |

OTHER PUBLICATIONS

B. Jeong, J. Ihm, and Gun-Do Lee. Stability of dislocation defect with two pentagon-heptagon pairs in graphene. Physical Review B, 78, 165403 (2008).*

Jiang, D., et al. Porous graphene as the ultimate membrane for gas separation. Nano Letters, 2009, 9(12): 4019-4024.*

Suk, Myung E. et al. Water transport through ultrathin graphene. J. Phys. Chem. Letter, 2010, 1, p. 1590-1594.*

Chen et al. ("Synthesis and characterization of large-area graphene and graphite films on commercial Cu—Ni alloy foils". Nano Letters, vol. 11, Jul. 26, 2011, pp. 3519-3525).*

Huang et al. ("Grains and grain boundaries in single-layer graphene atomic patchwork quilts". Nature, vol. 469, Jan. 20, 2011, pp. 389-392).*

Nair et al. ("Unimpeded permeation of water through helium-leak-tight graphene-based membranes". Science, vol. 335, Jan. 27, 2012, pp. 442-444).*

Yao et al. "Controlled Growth of Multilayer, Few-Layer, and Single-Layer Graphene on Metal Substrates". (J. Phys. Chem. C, 115, Mar. 11, 2011, pp. 5232-5238).*

M. Poot, et al., "Nanomechanical properties of few-layer graphene membranes," Applied Physics Letters, 92, 063111 (2008).

Ashish Kumar Mishra, et al., "Functionalized graphene sheets for arsenic removal and desalination of sea water," Desalination, vol. 282, pp. 39-45 (2011).

European Search Report dated Jul. 25, 2012 issued in European Application No. 12163714.4-2113.

Robeson, L., "The upper bound revisited", Journal of Membrane Science, vol. 320, 2008, pp. 390-400, Apr. 22, 2008.

Myungwoong Kim et al., "Fabrication and Characterization of Large-Area, Semiconducting Nanoperforated Graphene Materials," Nano Letters, 2010, vol. 10, No. 4, pp. 1125-1131.

De-en Jiang et al., "Porous Graphene as the Ultimate Membrane for Gas Separation," Nano Letters, 2009, vol. 9, No. 12, pp. 4019-4024.

Dong Ick Son et al., "Flexible Organic Bistable Devices Based on Graphene Embedded in an Insulating Poly(methyl methacrylate) Polymer Layer," Nano Letters, vol. 10 Issue: 7, pp. 2441-2447, May 26, 2010.

* cited by examiner

SEPARATION MEMBRANE INCLUDING GRAPHENE

CROSS-REFERENCE TO RELATED APPLICATIONS

This application claims priority under 35 U.S.C. §119 to Korean Patent Application No. 10-2011-0033373, filed on Apr. 11, 2011, in the Korean Intellectual Property Office, the disclosure of which is incorporated herein in its entirety by reference.

BACKGROUND

1. Field

Example embodiments relate to a separation membrane, and more particularly, to a graphene-containing separation membrane and/or a sea-water desalination and/or gas separation apparatus including the same.

2. Description of the Related Art

Example embodiments relate to a graphene-containing separation membrane, a method of preparing the same, and/or a gas/liquid separation apparatus employing the graphene-containing separation membrane, and for example, to a graphene-containing separation membrane, a method of preparing the graphene-containing separation membrane, and/or a gas/liquid separation apparatus using the graphene-containing separation membrane.

Gas separation processes include membrane separation processes, pressure swing adsorption (PSA) processes, cryogenic processes, and the like. PSA and cryogenic processes have been developed, and are currently used. Gas separation using membrane separation is relatively short in history.

In 1977, Monsanto Co. developed a gas separation process using a polymer membrane and this led to a gas separation module marketed under the product name PRISM. Air Products currently markets gas separation products using polymer membranes under the product name PRISM®.

Gas separation membranes may use organic polymers, including polysulfone, polycarbonate, polypyrrolones, polyarylate, cellulose acetate, polyimide, and the like. Although some polymer materials show high separation efficiency with respect to specific gas mixtures, many polymer materials have limited applications because of high costs and manufacturing difficulties. The manufacturing difficulties may include difficulties related to manufacturing separation membranes in the form of a planar thin film sheet or a hollow thread.

In general, natural and synthetic polymer gas separation membranes formed with a dense structure on a solid membrane (such as planar membrane, composite membrane, or hollow thread form) may exhibit high selectivity with respect to gas mixtures, and have been manufactured largely as an asymmetric membrane with a thin selective separation membrane on a porous support to increase a flow amount to pass per unit time.

However, polymer materials with commercially available performance in air separation (an oxygen permeability of 1 Barrer (1 Barrer=10-10 (cm3(STP) cm/cm$^2$s cmHg) and an oxygen/nitrogen selectivity of 6.0 or greater) are considerably limited to a few in number. This is attributed to considerable restrictions in improving a polymer structure and a strong tradeoff between permeability and selectivity, which means a limit to the separation and permeability performance beyond upper limits. Furthermore, many existing polymer membrane materials are noticeably limited in permeability and separation characteristics.

Additionally, many existing polymer membrane materials decompose or age when exposed to high-pressure and high-temperature processes, or to gas mixtures including a hydrocarbon, aromatic hydrocarbons, and polar solvent for a long time, thereby leading to a markedly reduced initial membrane performance. Despite of high economical values of the gas separation process, these drawbacks have restricted the applications for many polymer membrane materials.

Therefore, polymer materials satisfying high permeability and selectivity requirements and the development of a novel gas separation membrane employing these materials is desired.

SUMMARY

Example embodiments relate to a graphene-containing separation membrane with high balance between permeability and selectivity, good resistance to heat and chemicals, good mechanical characteristics, and high selectivity with respect to gas without a marked reduction in permeability with respect to polymers.

Additional aspects will be set forth in part in the description which follows and, in part, will be apparent from the description, or may be learned by practice of example embodiments.

According to example embodiments, a separation membrane includes a polymer support and graphene on at least one surface of the polymer support. The graphene may include a plurality of grains defined by grain boundaries.

The grain boundaries may be configured to pass a target substance to separate the target substance from a mixture containing the target substance.

The graphene may have a multi-layer structure.

The separation membrane may further include a sheet comprising at least one of a transition metal dichalcogenide, $MY_2$, $TiS_2$, $TiSe_2$, $NbS_2$, $NbSe_2$, $TaS_2$, $TaSe_2$, transition metal phosphorus trisulfide, $MPY_3$, $FePS_3$, transition metal oxyhalide (MOX), $(MCl)LaNb_2O_7$, transition metal dihalide (MX2), $CuBr_2$, $CdBr_2$, $CdI_2$, $CuCl_2$, BCN, $B_2CN$, $BC_6N$, layered silicate, mica, talc, $Al_2Si_2O_6(OH)_4$, layered titanate $(TiO_x, x<2)$, $\alpha$-$Zr(HPO4)_2$ $H2O$, $\gamma$-$FeO(OH)$, and $Al(OH)_3$, wherein M indicates at least one transition metal, Y indicates one of S and Se, and X indicates a halogen.

The polymer support may include one of a dense membrane structure and a microporous structure.

The polymer support may include at least one of polysulfone, polyethersulfone, polyimide, polyamide, polyetherimide, polyacrylonitrile, poly(methyl methacrylate), polyethylene, polycarbonate, polytetrafluoroethylene, polypropylene, and polyvinylidene fluoride.

The separation membrane may include at least one of channels and pores defined by the plurality grains.

The separation membrane may include pores. The pores may be defined by lattice distortion due to at least one of at least one 5-membered ring and at least one 7-membered ring in the graphene.

The pores may have a width of about 0.335 nm to about 100 nm.

A width of the pores or the channels in the graphene may be allow selective separation of a first gas from a gas mixture containing the first gas and a second gas. The first gas may be hydrogen or nitrogen. The second gas may be oxygen.

According to example embodiments, a sea-water desalination apparatus includes the separation membrane described above.

According to example embodiments, a gas separation apparatus includes the separation membrane described above.

The graphene may directly contact the polymer support.

An intermediate layer may be between the polymer support and the graphene. The intermediate layer may include at least one of an acrylic, urethane, silicon, and a poly(ethylene oxide)-based polymer resin.

The pores may be defined by lattice distortion due to at least one of at least one 5-membered ring and at least one 7-membered ring in the graphene. The graphene may be one of a monolayer and a multilayer structure.

The pores may have a width of about 0.335 nm to about 100 nm.

The graphene may be a multilayer structure including at least 3 monolayers separated by an interlayer distance of about 0.34 nm to about 0.5 nm.

The graphene may be a multilayer structure including 2 to 50 monolayers.

Each monolayer may have a thickness of about 0.6 nm.

The graphene may be a multilayer structure. A separation distance between at least two of the pores of one monolayer may be different than a separation distance between at least two of the pores of another monolayer of the graphene.

According to example embodiments, a separation membrane includes a graphene on a polymer support. The graphene includes at least one of pores and channels defined by grain boundaries.

According to example embodiments, a desalination apparatus may include the foregoing separation membrane. A width of the at least one of pores and channels in the graphene may be allow selective passage of water molecules and block hydrated salt ions from a solution containing the water and hydrated salt ions.

According to example embodiments, a gas separation apparatus may include the foregoing separation members. A width of the at least one of pores and channels in the graphene may allow selective separation of a first gas from a gas mixture containing at least the first gas and a second gas.

The first gas may be hydrogen and the second gas may be oxygen.

The first gas may be nitrogen and the second gas may be oxygen.

BRIEF DESCRIPTION OF THE DRAWINGS

The foregoing and/or other features and advantages of example embodiments will become apparent and more readily appreciated from the following description of non-limiting embodiments, taken in conjunction with the accompanying drawings in which like reference characters refer to the same parts throughout the different views. The drawings are not necessarily to scale, emphasis instead being placed upon illustrating the principles of example embodiments. In the drawings.

DETAILED DESCRIPTION

Figure 1:
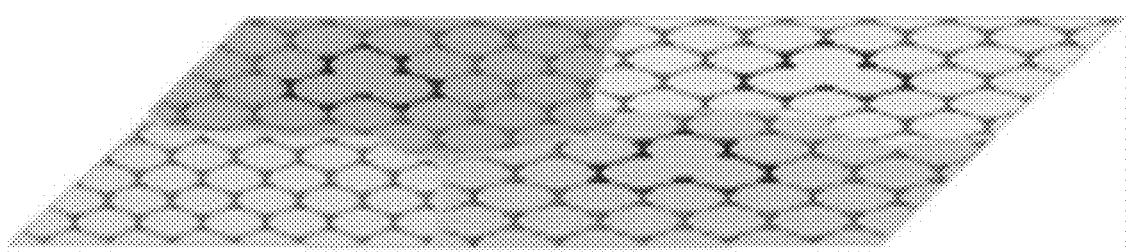
FIG. 1 is a schematic illustration of a structure of graphene including a plurality of grains defined by various forms of grain boundaries.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

According to example embodiments, a separation membrane is obtained by transferring a graphene layer that includes a plurality of grains defined by various forms of grain boundaries to at least one surface of a polymer support, the separation membrane exhibiting enhanced selectivity without a marked reduction in inherent permeability of the polymer support due to a small thickness of the graphene layer.

The term "graphene" as used herein refers to a polycyclic aromatic molecule comprising a plurality of carbon atoms connected to each other by a covalent bond. The plurality of carbon atoms may form a six-membered ring as a standard repeating unit, or may further include 5-membered rings and/or 7-membered rings. Accordingly, the graphene may be a single layer of covalently bonded carbon atoms generally having sp2 hybridization. The graphene may have any of various structures, depending upon the content of 5-membered rings and/or 7-membered rings in the graphene. A plurality of graphene layers are often referred to in the art as graphite. However, for convenience, "graphene," as used herein, may comprise one or more layers of graphene. Thus, as used herein, graphene may refer to a single layer of carbon or may refer to a plurality of stacked single layers of graphene.

The graphene including a plurality of grains defined by various forms of grain boundaries may have a structure illustrated in FIG. 1. Referring to FIG. 1, the 2-dimensional, planar-structured graphene includes a plurality of grains in various shapes defined by various grain boundaries. The grains have crystalline structures due to different orientations of growth of the graphene during a growing process. The grain boundaries define boundary regions among individual crystalline grains and provide molecular-scale fine gaps in the graphene due to different energy levels of the grains.

In general, such a graphene may be prepared using various methods such as a liquid phase method, a vapor phase method, a polymer method, and the like, to grow with various grain boundaries, as illustrated in FIG. 1 during a graphene growing process.

Through the fine pores defined by the grain boundaries, specific ions or a gas- or liquid-containing mixture may be selectively filtered out.

Figure 2:
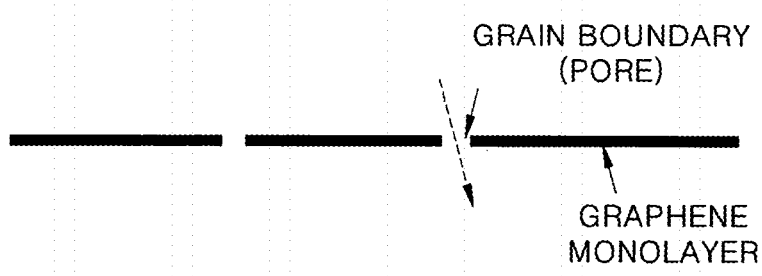
FIG. 2 is a cross-sectional view of graphene including a plurality of grains defined by various forms of grain boundaries.

FIG. 2 illustrates fine pores and channels defined by the grain boundaries in a graphene monolayer and transmission of a material. Since the thickness of the graphene monolayer is as small as about 0.6 nm, the overall bulk flow through the graphene may not be significantly influenced as long as the pores defined by the grain boundaries are sufficiently controlled.

Figure 3:
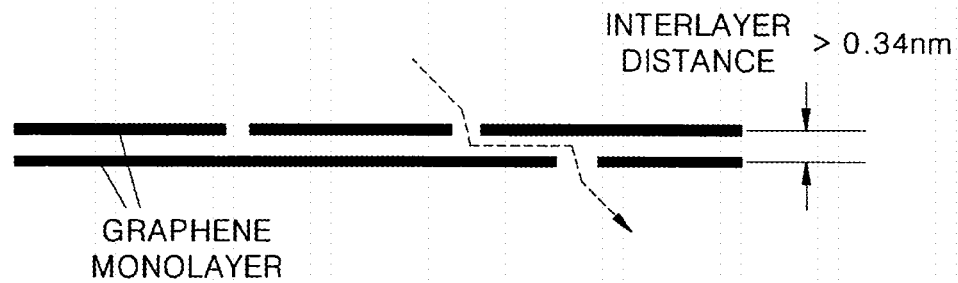
FIG. 3 is a cross-sectional view of a double-layer graphene including a plurality of grains defined by various forms of grain boundaries.

FIG. 3 illustrates a double-layer graphene including two graphene monolayers as illustrated in FIG. 2 with an interlayer distance of about 0.34 nm or greater (but less than 0.5 nm). For a multilayer graphene as in FIG. 3, an additional flow path linking grain boundaries in different graphene layers may be defined. A channel may be defined between two graphene monolayers. Furthermore, the sizes of the pores of grain boundaries and channels may be adjusted to enhance separation selectivity of a particular substance. As shown in FIG. 3, the spacing between pores in one monolayer may be different than the spacing between pores in another monolayer of the graphene.

The graphene with the multi-layer structure may elongate a diffusion path of a substance, leading to an increased transmission ratio of two substances of interest to separate. Therefore, adding more graphene layers may increase the selectivity of separating two substances.

For such a multilayer graphene, each graphene monolayer has a thickness as small as about 0.6 nm with an interlayer distance as short as about 0.34 nm or greater (but less than <0.5nm) from the other one, and thus, the selectivity of separation may be improved without a significant reduction in permeability of organic polymers.

Figure 4:
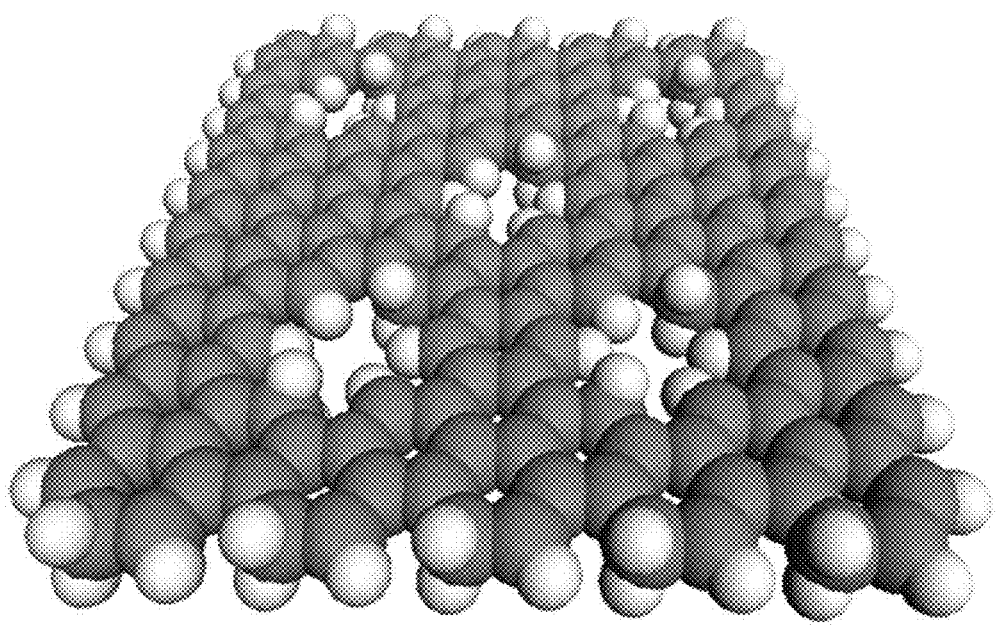
FIG. 4 is a schematic illustration of a structure of a graphene monolayer including defects.

The graphene separation membrane may include pores originating from molecular defects, in addition to those defined by the grain boundaries. Though including 6-membered rings as repeating units, graphene may include particle defects near 5-membered rings and/or 7-membered rings, which may lead to fine pores in the graphene grains, as illustrated in FIG. 4. These fine pores may be of use in selectively separating various kinds of ions, liquids, gases, and the like. Pores may be introduced into the graphene layer by a lattice distortion due to at least one of at least one 5-membered ring and at least one 7-membered ring.

The size of the pores in the graphene may be adjusted by changing graphene preparation conditions, by changing a carbon supply source, and the like. The sizes of the pores and channels may be changed by, for example, adjusting a graphene growth rate, or by changing the carbon supply source to methane or hydrocarbon-based organic polymers. The pores may have a width of about 0.335 nm to 100 nm. However, example embodiments are not limited thereto.

The sizes of the pores and channels may be changed to selectively separate a specific substance of interest to filter.

For example, for a gas mixture containing hydrogen/carbon dioxide, oxygen, and nitrogen, the sizes of pores and channels may be adjusted to allow selective separation of the hydrogen and oxygen with relatively small dynamic distances from the gas mixture. For a salt ion-containing aqueous solution, the sizes of pores and channels may be adjusted to be so small to selectively pass only water molecules and block the hydrated salt ions.

Figure 5:
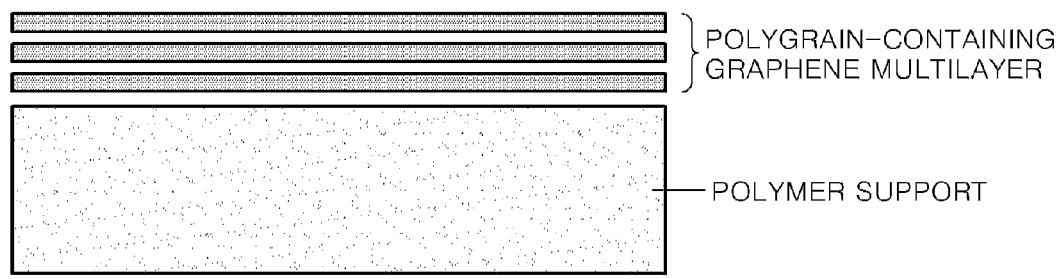
FIG. 5 illustrates a structure of a separation membrane with a multilayer graphene transferred on a polymer support, according to example embodiments.

FIG. 5 illustrates a structure of a separation membrane with a multilayer graphene transferred on a polymer support, according to example embodiments. The graphene-containing separation membranes having multi-layered structures may be combined by selecting various unit layers, according to an atomic arrangement, a pore size, defects and the like.

The spacing between pores in one monolayer may be different than the spacing between pores in another monolayer of the graphene. The size of pores in one monolayer may be the same or different compared to the size of pores in another monolayer. Further, one monolayer of the graphene may include more, the same, or fewer pores than another monolayer of the graphene. However, example embodiments are not limited thereto.

The polymer support is mainly responsible for supporting the graphene, and may further function as a filter because of having a dense membrane structure or a microporous structure.

The polymer support may be a microporous support. The microporous support is a polymer structure including pores that contact the graphene and are large enough to allow a target substrate to pass through. The polymer support may have a pore size of, for example, from about 1 nm to about 100 nm. The microporous polymer support may be formed of any of various halogenated polymers, including but not limited to, polysulfone, polyethersulfone, polyimide, polyamide, polyetherimide, polyacrylonitrile, poly(methyl methacrylate), polycarbonate, polyethylene, polytetrafluoroethylene, polypropylene, and polyvinylidene fluoride.

The thickness of the polymer support is not specifically limited. The thickness of the polymer support may be from about 25 μm to about 125 μm, and may be from about 40 μm to about 75 μm. However, example embodiments are not limited thereto.

The separation membrane obtained by transferring graphene with various grain boundaries onto a polymer support as described above may limit (and/or minimize) a reduction in the amount of a target substance passing through due to the small thickness of the graphene, and may increase the selectivity of separation by appropriately adjusting the pore sizes of the graphene and/or the multilayer graphene.

Figure 7:
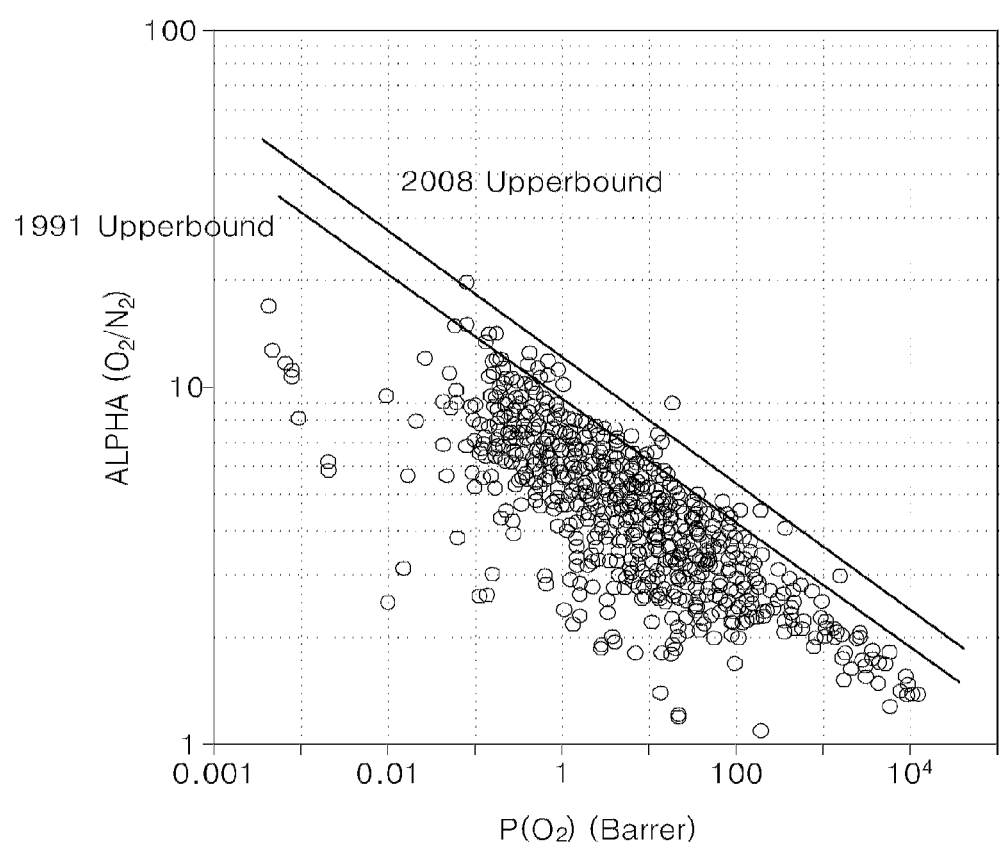
FIG. 7 is a graph illustrating an inversely proportional relationship between permeability and selectivity in an existing gas-separating polymer membrane for separating oxygen and nitrogen.

FIG. 7 is a graph illustrating an inversely proportional relationship between permeability and selectivity in an existing gas-separating polymer membrane for separating oxygen and nitrogen, indicating the presence of an upper bound in performance. Referring to FIG. 7, in the existing gas-separating polymer membrane, if the permeability is increased, the selectivity and separation efficiency becomes low, leading to low separation efficiency. On the other hand, if the selectivity is increased, the permeability becomes low, leading to low separation efficiency. Since there are upper bounds to selectivity and permeability, attaining desired (and/or alternatively predetermined) levels of selectivity and permeability beyond the upper bounds is limited in existing gas-separating polymer membranes for separating oxygen and nitrogen.

Figure 8:
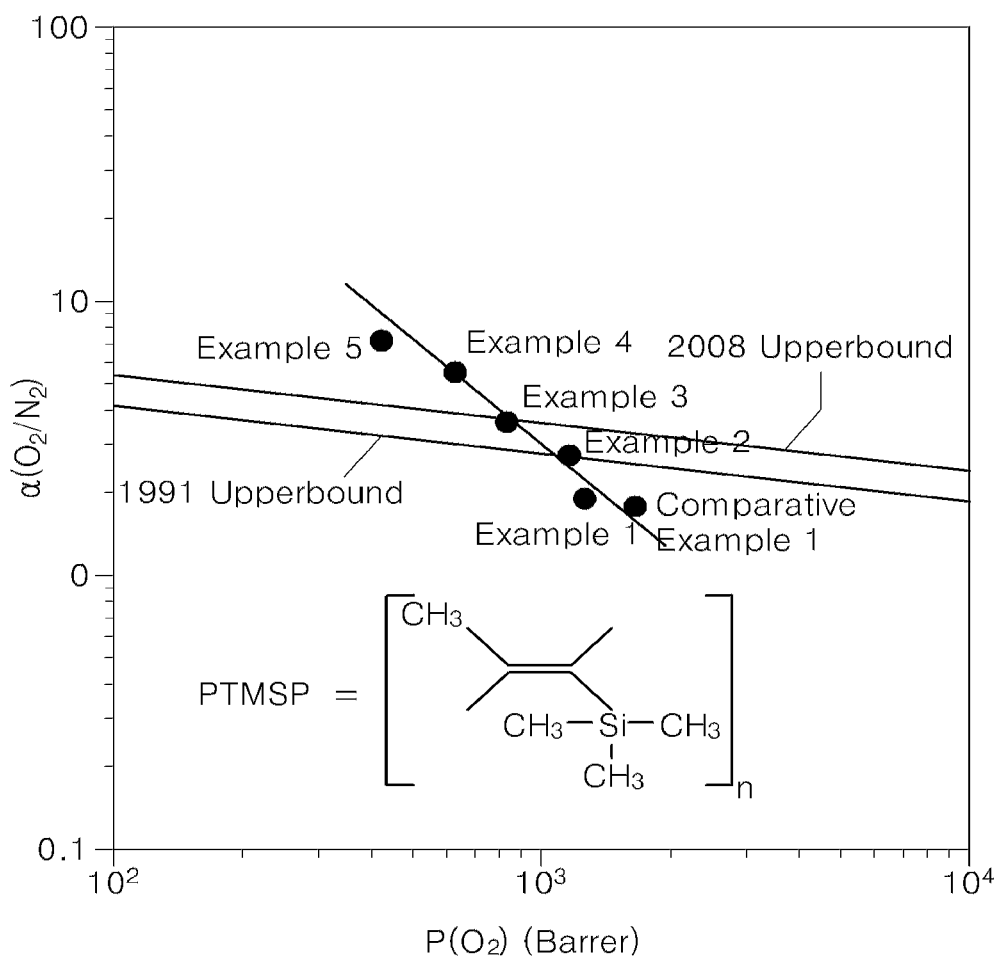
FIG. 8 is a graph of separation efficiencies of graphene-containing separation membranes according to Examples 1-5 and Comparative Example 1.

However, referring to FIG. 8, relative to poly(1-trimethylsilyl-1-propyne) (PTMSP) (having an oxygen permeability of 8800 Barrer, a nitrogen permeability of 6400 Barrer, and an oxygen/nitrogen selectivity of 1.375) that is known so far as a glass polymer having the highest permeability, but has limited applications as a gas separation membrane material due to its low oxygen/nitrogen selectivity, graphene-containing separation membranes prepared in Examples 2-5 are composite membranes obtained by transferring a multilayer graphene, for example, one to five layers of graphene, to a dense PTMSP membrane, are found to have higher permeability and selectivity to polymers that are beyond the upper bounds of the gas-separating polymer membrane of FIG. 7.

Graphene used in graphene-containing separation membranes according to example embodiments may be prepared using any of various existing methods. According to example embodiments, after a graphitization catalyst in a sheet form is thermally treated together with a gaseous or liquid carbon supply source at a desired (and/or alternatively predetermined) temperature to form a sheet of graphene on a surface of the graphitization catalyst, the sheet of graphene may be separated from the graphitization catalyst, resulting in graphene with various grain boundary structures.

A graphene-containing separation membrane may further include a material in a planar sheet form on the graphene or between the graphene and the polymer support. The sheets may be used to control a chemical and/or physical interaction of a material separated through graphene-containing separation membranes according to example embodiments. Examples of the sheet material include transition metal dichalcogenide, $MY_2$, $TiS_2$, $TiSe_2$, $NbS_2$, $NbSe_2$, $TaS_2$, $TaSe_2$, transition metal phosphorus trisulfide, $MPY3$, $FePS3$, transition metal oxyhalide (MOX), $(MCI)LaNb_2O_7$, transition metal dihalide ($MX_2$), $CuBr_2$, $CdBr_2$, $CdI_2$, $CuCl_2$, BCN, B2CN, $BC_6N$, layered silicate, mica, talc, $Al2Si_2O_5(OH)_4$, layered titanate (TiOx, x<2), $\alpha$-$Zr(HPO4)2$ $H_2O$, $\gamma$-FeO(OH), $Al(OH)_3$, and the like, wherein M in the above-listed formulae indicates at least one transition metal, and Y in the above listed formulae indicates at least one of S and Se.

The transition metals refer to the d-block elements in the periodic table of elements, i.e., the elements in Groups 3 to 12. According to example embodiments, M may be chromium (Cr), manganese (Mn), iron (Fe), or cobalt (Co), but example embodiments are not limited thereto.

The prepared graphene may be transferred to at least one surface of a polymer support, thereby forming a graphene-containing separation membrane. The graphene may include a plurality of layers from one to fifty layers, from one to twenty layers, and from one to ten layers, from five to forty-five layers, from ten to forty layers, from twenty to thirty layers, taking permeability into account. To form layers of graphene on the polymer support, a graphene monolayer may be repeatedly stacked on the polymer support as many times as the number of graphene layers to transfer to the polymer support.

The size and shape of the graphene are not particularly limited, and may be appropriately chosen according to the use of the graphene. For example, graphene having an area of about 1 cm×about 1 cm or greater may be used, but the upper limit of the area may depend on the use of the graphene. For example, the area of the graphene may be of about 100 m×about 100 m, about 10 m×about 10 m, and about 1 m×about 1 m. Further, the size and shape of the graphene may include a length and width having different dimensions (e.g., 1 cm×10 cm, 1 m×10 m, 10 m×100 m).

The polymer support may include a dense membrane material, such as PTMSP, poly(dimethylsiloxane), polyimide, polystyrene, polycarbonate, cellulose acetate, polysulfone, polyethersulfone, and polyphenylene oxide, and a microporous separation membrane material such as porous polysulfone, porous polyethersulfone, porous polyacrylonitrile, porous polyvinylidene fluoride, porous cellulose acetate, porous polyamide, and porous polyimide. The porous support may have a thickness of, for example, but not limited to, from about 1 μm to about 100 μm.

An intermediate layer may be further disposed between the polymer support and the graphene. The intermediate layer may further include at least one of acrylic, urethane, silicon, a poly(ethylene oxide)-based polymer resin, and the like. However, example embodiments are not limited thereto.

According to example embodiments, the graphene-containing separation membrane as described above may be of use in separating various kinds of ions, gases, or liquids, and in particular, in sea-water desalination plants or in separating oxygen and nitrogen from a mixed oxygen and nitrogen gas for use in oxygen enrichment and nitrogen production.

Due to the graphene having a thin thickness, the graphene-containing separation membrane may undergo a minimal reduction in permeability, having an increased selectivity of separation and a higher separation efficiency, and thus, may be applied to manufacture an improved separation membrane module and system.

Example embodiments will be described in further detail with reference to the following non-limiting examples, which are for illustrative purposes only and are not intended to be limiting.

EXAMPLE 1

Preparation of Graphene

A Cu foil (75 μm, available from Wacopa Co.) was put in a chamber, and was then thermally treated at about 1,000° C. for about 30 minutes with a supply of H2 at 4 sccm. After CH4 and H2 were further flowed into the chamber at about 20 sccm and about 4 sccm, respectively, for about 30 minutes, the interior of the chamber was naturally cooled, thereby forming a graphene monolayer of 2 cm×2 cm in size.

Afterward, the Cu foil with the graphene sheet was coated with a 10wt % solution of polymethylmethacrylate (PMMA) dissolved in acetone at about 1,000 rpm for about 60 seconds, and was then immersed in an etchant (e.g., potassium peroxymonosulfate, an etchant corresponding to OXONE®, available from Dupont) for about 1 hour to remove the Cu foil and obtain the graphene sheet attached on the PMMA. After the graphene sheet attached on the PMMA was attached to a PTMSP film, the PMMA was removed using acetone, thereby forming a separation membrane with the graphene monolayer.

Figure 6:
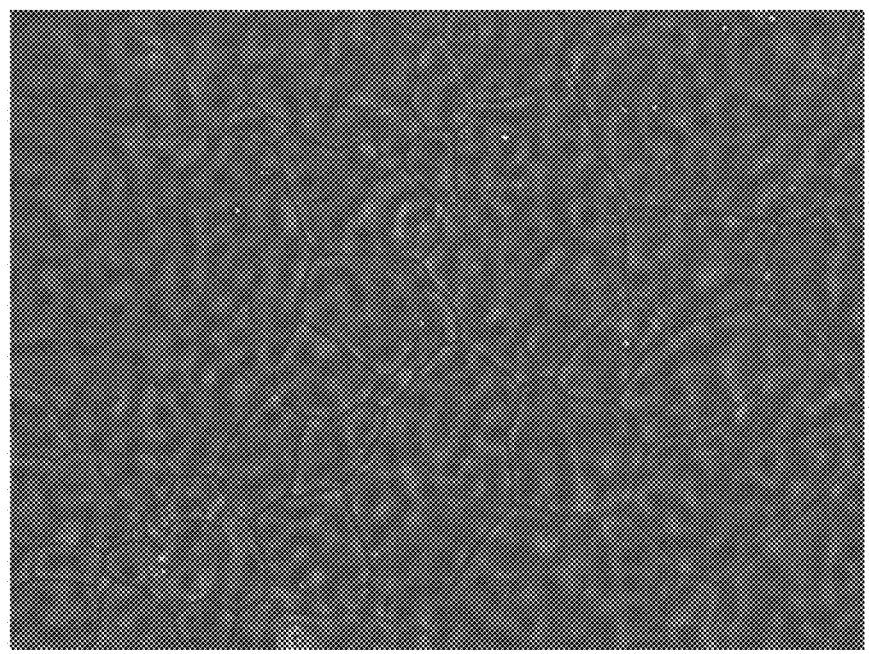
FIG. 6 is a surface image of a separation membrane with a graphene monolayer transferred on a polymer support.

FIG. 6 is a surface image of the graphene monolayer-containing separation membrane manufactured as described above. Referring to FIG. 6, the graphene monolayer-containing separation membrane is found to include a plurality of grains defined by various grain boundaries.

EXAMPLES 2-5

The separate graphene sheet attached to the PMMA was additionally stacked onto the graphene-containing separation membrane of Example 1 as many times as the number of graphene layers to form, followed by a removal of the PMMA with acetone, thereby forming a two graphene layers-containing separation membrane (Example 2), a three graphene layers-containing separation membrane (Example 3), a four graphene layers-containing separation membrane (Example 4), and a five graphene layers-containing separation membrane (Example 5).

COMPARATIVE EXAMPLE 1

PTMSP of 5 cm×5 cm in size was dissolved in toluene to prepare a 10wt % PTMSP solution, which was then cast on a glass place to form a 50 μm-thick PTMSP polymer dense membrane using phase transition.

EXPERIMENTAL EXAMPLE 1

An oxygen/nitrogen separation test was performed on the separation membranes of Comparative Example 1 and Examples 1-5, in which permeabilities were measured using a constant pressure, volume-variable method at about 25° C. at a pressure of 1 atm. According to the measurement method, each separation membrane was placed in a stainless steel gas-permeability measuring cell with the pressure of a gas to measure maintained constant above the cell, and a flow amount of the gas that passed through the separation membrane (including upper and lower graphene layers) by a constant pressure gradient in the separation membrane was measured using a digital or analog flow meter in volume per unit of time as a permeability of each gas.

As shown in FIG. 8, the graphene-containing separation membranes of Examples 1-5 are found to have high separation efficiencies, and in particular, the graphene-containing separation membranes of Examples 3-5, including graphene multilayers, are found to be higher in separation efficiency beyond the upper bound of the separation membrane of Comparative Example 1.

As described above, according to example embodiments, by using a separation membrane with at least one layer of graphene including a plurality of grains defined by various grain boundaries, the selectivity of separation may be improved compared to existing separation membrane materials without a significant reduction in inherent permeability of the existing separation membrane materials. Therefore, a highly-efficient separation membrane system may be implementable with various existing separation membrane materials that have limited applications due to low selectivity despite of their high inherent permeability.

While some example embodiments have been particularly shown and described, it will be understood by one of ordinary skill in the art that variations in form and detail may be made therein without departing from the spirit and scope of the claims. Descriptions of features or aspects within some example embodiments should typically be considered as available for other similar features or aspects in other example embodiments.

What is claimed is:
1. A separation membrane comprising:
a polymer support; and
at least one graphene monolayer on at least one surface of the polymer support, the graphene monolayer being 2-dimensional and planar-structured,
wherein the graphene monolayer includes a plurality of grains defined by grain boundaries,
the grain boundaries provide gaps present along the grain boundaries between the grains in the graphene monolayer, and the gaps between the grains in the graphene are configured to pass a target substance to separate the target substance from a mixture containing the target substance, wherein the at least one graphene monolayer on the polymer support has a first fluid permeability in a range of about 400 Barrer to about 1200 Barrer, and wherein the at least one graphene monolayer on the polymer support has an first fluid/second fluid selectivity of at least about 1.5.

2. The separation membrane of claim 1, wherein the separation membrane has a multi-layer structure including at least two graphene monolayers.

3. The separation membrane of claim 1, further comprising:
a sheet connected to at least one of the polymer support and the graphene, the sheet including at least one of,
a transition metal dichalcogenide ($MY_2$),
a transition metal phosphorus trisulfide ($MPY_3$),
a transition metal oxyhalide (MOX),
$(MCl)LaNb_2O_7$,
one of BCN, $B_2CN$, $BC_6N$, layered silicate, mica, talc, $Al_2Si_2O_5(OH)_4$, layered titanate ($TiO_x$, x<2), α-Zr $(HPO_4)_2 \cdot H_2O$, γ-FeO(OH), and $Al(OH)_3$, and
a transition metal dihalide ($MX_2$), wherein
M indicates at least one transition metal,
Y indicates one of S and Se, and
X indicates a halogen.

4. The separation membrane of claim 3, wherein
the transition metal dichalcogenide ($MY_2$) includes at least one of $TiS_2$, $TiSe_2$, $NbS_2$, $NbSe_2$, $TaS_2$, $TaSe_2$,
the transition metal phosphorus trisulfide ($MPY_3$) includes $FePS_3$, and
the transition metal dihalide ($MX_2$) includes one of $CuBr_2$, $CdBr_2$, $CdI_2$, and $CuCl_2$.

5. The separation membrane of claim 1, wherein the polymer support includes one of a dense membrane structure and a microporous structure.

6. The separation membrane of claim 1, wherein the polymer support includes at least one of polysulfone, polyethersulfone, polyimide, polyamide, polyetherimide, polyacrylonitrile, poly(methyl methacrylate), cellulose acetate, polyethylene, polycarbonate, polytetrafluoroethylene, polypropylene, and polyvinylidene fluoride.

7. A sea-water desalination apparatus including the separation membrane according to claim 1, wherein
the graphene monolayer includes pores defined by grain boundaries, and at least one of a width of the pores in the graphene monolayer and a width the gaps present along the grain boundaries between the grains in the graphene monolayer allows selective passage of water molecules and blocks hydrated salt ions from a solution containing the water molecules and the hydrated salt ions.

8. A gas separation apparatus including the separation membrane according to claim 1.

9. The separation membrane of claim 1, further comprising:
at least one of channels and pores defined by the plurality of grains, wherein
the at least one of channel and pores are through the grains.

10. The separation membrane of claim 9, wherein the graphene monolayer has molecular defects therein, and the molecular defects provide pores dimensioned to allow target ions, liquids, or gases to pass through the graphene monolayer.

11. The separation membrane of claim 9, wherein the pores have a width of about 0.335 nm to about 100 nm.

12. The separation membrane of claim 9, wherein
a width of the at least one of pores and channels in the graphene monoloayer allows selective separation of a first gas from a gas mixture containing at least the first gas and a second gas,
the first gas is one of hydrogen and nitrogen, and
the second gas is oxygen.

13. A separation membrane comprising:
a polymer support; and
at least one graphene monolayer on the polymer support, the graphene monolayer having at least one of pores and channels defined by grain boundaries,
wherein the at least one of pores and channels are present along the grain boundaries, and the at least one of pores and channels are configured to pass a target substance to separate the target substance from a mixture containing the target substance,
wherein the at least one graphene monolayer on the polymer support has a first fluid permeability in a range of about 400 Barrer to about 1200 Barrer, and
wherein the at least one graphene monolayer on the polymer support has a first fluid/second fluid selectivity of at least about 1.5.

14. The separation membrane of claim 1, wherein the graphene monolayer directly contacts the polymer support.

15. The separation membrane of claim 1, further comprising:
an intermediate layer between the polymer support and the graphene monolayer.

16. The separation membrane of claim 15, wherein the intermediate layer includes at least one of an acrylic, urethane, silicon, and poly(ethylene oxide)-based polymer resin.

17. The separation membrane of claim 1, wherein the separation membrane has a multilayer structure including at least three graphene monolayers separated by an interlayer distance of about 0.34 nm to about 0.50 nm.

18. The separation membrane of claim 1, wherein the separation membrane has a multilayer structure including 2 to 50 graphene monolayers.

19. A desalination apparatus including the separation membrane according to claim 13,
wherein a width of the at least one of pores and channels in the graphene monolayer allows selective passage of water molecules and blocks hydrated salt ions from a solution containing the water molecules and the hydrated salt ions.

20. A gas separation apparatus including the separation membrane according to claim 13,
wherein a width of the at least one of pores and channels in the graphene monolayer allows selective separation of a first gas from a gas mixture containing the first gas and a second gas.

21. The gas separation apparatus of claim 20, wherein the first gas is hydrogen and the second gas is oxygen.

22. A separation membrane comprising:
a polymer support; and
a graphene including at least one monolayer on at least one surface of the polymer support, the graphene being 2-dimensional and planar-structured,
wherein the graphene includes a plurality of grains defined by grain boundaries, and the grain boundaries provide gaps present along the grain boundaries between the grains in the graphene, the gaps between the grains in the graphene are configured to pass a target substance to separate the target substance from a mixture containing the target substance, the grains include molecular defects that define pores in the grains, the pores are dimensioned to allow target ions, liquid, or gases to pass through the graphene, and the pores are defined in the grains and spaced apart from the gaps between the grains, wherein the at least one graphene monolayer on the polymer support has a first fluid permeability in a range of about 400 Barrer to about 1200 Barrer, and wherein the at least one graphene monolayer on the polymer support has an first fluid/second fluid selectivity of at least about 1.5.

23. The separation membrane of claim 22, wherein the graphene includes a plurality of monolayers stacked on top of each other on the polymer support, the graphene includes channels defined by adjacent monolayers among the plurality of monolayers, wherein each of the monolayers include the grains defined by the grain boundaries, the grains include the molecular defects that the define pores in the grains, the pores and channels are configured to pass the target substance to separate the target substance from a mixture containing the target substance, and the spacing between pores in one of the monolayers is different than the spacing between pores in a different one of the monolayers.

24. The separation membrane of claim 1, wherein the first fluid is oxygen, and the second fluid is nitrogen.

25. The separation membrane of claim 13, wherein the first fluid is oxygen, and the second fluid is nitrogen.

26. The separation membrane of claim 22, wherein the first fluid is oxygen, and the second fluid is nitrogen.

27. The separation membrane of claim 22, wherein a width of the gaps between the grains in the graphene allows selective passage of water molecules and blocks hydrated salt ions from a solution containing the water molecules and the hydrated salt ions.

* * * * *